(12) United States Patent
Aubele

(10) Patent No.: US 6,759,670 B2
(45) Date of Patent: Jul. 6, 2004

(54) METHOD FOR DYNAMIC MANIPULATION OF A POSITION OF A MODULE IN AN OPTICAL SYSTEM

(76) Inventor: Karl-Eugen Aubele, Lindenrainstrasse 241, D-73312 Geislingen (DE)

( * ) Notice: Subject to any disclaimer, the term of this patent is extended or adjusted under 35 U.S.C. 154(b) by 0 days.

(21) Appl. No.: 10/002,635

(22) Filed: Nov. 15, 2001

(65) Prior Publication Data

US 2002/0074529 A1 Jun. 20, 2002

(30) Foreign Application Priority Data

Nov. 16, 2000 (DE) .......................................... 100 56 782

(51) Int. Cl.[7] .............................................. G01N 21/86
(52) U.S. Cl. ................................ 250/559.29; 250/559.3
(58) Field of Search ....................... 250/231.15, 231.16, 250/237 G, 237 R, 559.32, 559.29, 221, 548, 559.3; 341/13; 356/27, 28, 28.5, 616, 617, 622

(56) References Cited

U.S. PATENT DOCUMENTS 4,305,283 A  * 12/1981  Redding ................... 73/290 V
4,857,717 A     8/1989  Chino
6,047,135 A     4/2000  Hamada
6,560,059 B1 *  5/2003  Hsin et al. ................ 360/78.04

FOREIGN PATENT DOCUMENTS

EP           0596301           11/1994

* cited by examiner

*Primary Examiner*—Que T. Le
(74) *Attorney, Agent, or Firm*—Welsh & Katz, Ltd.

(57) ABSTRACT

A method is used for dynamic manipulation and/or for adjustment of a module or a component in an optical system, in particular in a microlithographic projection exposure objective for manufacture of semiconductors. The module or component is displaced by at least two actuators, which have detectors for determining at least their relative path displacements. A position of the module or component is determined by at least two sensors, the sensors and the actuators, with their detectors communicating with one another in the manner of a control loop. At least one impulse is exerted on the module or component by the actuators. The timing of the impulse can be deliberately varied, to which end the displacement of the actuators is carried out with a time-variant velocity profile dictated as a function of a determined position $s_n^{actual}$ of the module or component. A position $s_n^{actual}$ of the module or component is re-determined after the velocity profile, has been executed. The aforementioned method steps are repeated until the desired position $s_{setpoint}$ of the module or component is reached.

36 Claims, 2 Drawing Sheets

METHOD FOR DYNAMIC MANIPULATION OF A POSITION OF A MODULE IN AN OPTICAL SYSTEM

BACKGROUND OF THE INVENTION

1. Field of the Invention

The invention relates to a method for dynamic manipulation and for adjustment of a module or a component in an optical system in the sub-$\mu$m range. More specific the invention relates to a method for dynamic manipulation and for adjustment of a module or a component in a microlithographic projection, exposure objective in the sub-$\mu$m range for the manufacture of semi-conductors.

2. Description of the Related Art

In order to adjust modules or components in optical systems in the sub-$\mu$m range, the general prior art knows only very elaborate adjustment processes, which need to be carried out "by hand" by experienced persons skilled in the art. To that end, use is made of control elements provided with corresponding step-up or step-down transmissions, for example with screw or worm drives or the like.

It is also known to persons skilled in the art that very fine re-adjustments of the components are possible through vibrations or impulses which, for example, can be applied to the corresponding components by means of a small hammer.

DE 42 36 795 C1 describes a corresponding device for adjusting mechanical components. The displacement of the components needed for the adjustment, this special case being one which relates to mirrors, is brought about using a mechanical pulse generator which, by means of a striker pin, exerts an impulse on the mounting of the component to be adjusted in a manner comparable with the aforementioned hammer.

This setup described in the aforementioned document is also comparatively elaborate, since it requires correspondingly high forces in order to be able to shift the components against their clamping, which is intended to hold them by a frictional lock.

In this method, vibrations also occur in the optical system, which can very easily lead to de-adjustment of components in a neighboring region.

The fact that owing to the vibrations, the optical quality of desired imagings cannot be ensured, at least at the time of the applied impulse, must certainly be regarded as a further disadvantage of the device described by the aforementioned document. The device is therefore unsuitable for dynamic manipulations, i.e. in general controlled re-setting during operation of the optical system.

Per se conceivable manipulation or adjustment by continuous movement of the components cannot, however, also be achieved in the sub-$\mu$m range since, in this case, effects due to unavoidable mechanical roughnesses and inaccuracies occur, which lead to serious problems and undesired positional changes of the components. For instance, the inventors' experience has shown that with all conventional control methods, which operate with proportional and/or integral and/or differential control aspects, satisfactory results cannot be achieved for the positioning of components in accuracy ranges of a few nanometers. This is probably due to the aforementioned mechanical inaccuracies which are reflected, for example, in microroughnesses, very nonuniform slip-stick effects and slight deviations of the mechanical components, for example the stiffnesses of solid-state joints or the like.

SUMMARY OF THE INVENTION

It is therefore the object of the invention to provide a method which, in particular, permits dynamic manipulation of the corresponding components, but also adjustment of the components, and which, with very few method steps, is capable of displacing the corresponding components in the sub-$\mu$m range into a sufficiently accurate position.

According to one aspect of the invention, this object is achieved by a method for dynamic manipulation of a module or a component in an optical system in the sub-$\mu$m range, the module or component being displaced by at least two actuators, which have detectors for determining at least their relative path displacements, a position of the module or component being determined by at least two sensors, the sensors and the actuators with their detectors communicating with one another in the manner of a control loop, and at least one mechanical impulse being exerted on the module or component by the actuators, wherein the timing of the impulse can be deliberately varied, to which end the displacement of the actuators is carried out with a time-variant velocity profile dictated as a function of a determined position ($s_n^{actual}$) with respect to a setpoint position ($s_{setpoint}$) of the module or component, the said position ($s_n^{actual}$) of the module or component being re-determined after the velocity profile has been executed, and the aforementioned method steps being repeated until the desired position ($s_{setpoint}$) of the module or component is reached.

In this context, the inventors have surprisingly and unexpectedly found that by the two consecutively organized method steps, in which the actuators execute the velocity profile and then, depending on the determined actual position, execute a further velocity profile matched to the setpoint/actual difference, it is possible to position the components very rapidly, i.e. with few repetitions of these steps.

It has been shown in tests that positioning with from three to at most five method steps is entirely realistic, which offers the particular advantage that this method is very fast and is therefore suitable for dynamic manipulation, i.e. re-adjustment of the microlithographic projection exposure objective of the modules or component during operation of the optical system.

In contrast to the problems, mentioned in the introduction, with the conventional control methods (PID controllers), the method according to invention provides both faster and better and more reliable manipulation of the optical elements.

The known problems of microlithographic projection exposure objectiveing in the sub-$\mu$m range, which are due to microroughnesses, slip-stick effects and slight deviations of the mechanical components, for example the stiffnesses of solid-state joints or the like, can be compensated for in a particularly favorable manner by the method according to the invention, which virtually enables an iterative approximation of the actual microlithographic projection exposure objective to the desired setpoint microlithographic projection exposure objective of the component or module.

It should fundamentally be pointed out that at least the rough relationship between the specified setpoint values and the actual value, which can never be exactly achieved owing to the aforementioned errors, should be of a linear form. The real function of the relationship will certainly be a very "wild" and unsteady curve, albeit one which can be approximated at least very roughly by the aforementioned linear relationship. Now, if the positioning steps to be achieved, which are reached through the variable velocity profile with which the actuators are driven, are rough enough, then the values will be oriented along this specified slope, so that the individual points that are actually achieved on the unsteady setpoint/actual function curve approximate the desired setpoint value in the manner of an iteration.

In a particularly favorable embodiment of the aforementioned method, it is in this case very favorable for the velocity profiles to respectively have at least one velocity gradient rising from an initial velocity and one velocity gradient falling to a final velocity, the slopes of which are matched in accordance with the path section still to be traveled, which in general becomes smaller and smaller from one method step to the next. For very large path sections, this may be a comparatively gently rising velocity gradient, which is followed by a further flat or optionally even constant velocity, before the corresponding final velocity is reached through a falling velocity gradient. If only very small positioning steps are needed, then it is possible for an only very small impulse, which then correspondingly entails only a very small displacement, to be given to the actuators through a very steep rising velocity gradient and a velocity gradient falling very steeply again immediately thereafter.

In this case, the gradients provide very gentle velocity changes, which can be executed rapidly but nevertheless in a manner which is comparatively free from vibrations.

The values of the initial velocity and the final velocity, according to a particularly favorable embodiment of the method, can in this case both be zero, so that very gentle adjustment of the actuators and therefore of the components, compared with an abrupt impulse, is achieved.

Through the aforementioned method, it has very favorably been found that very fast matching, which is even suitable for dynamic manipulation, of the actual position to the desired setpoint microlithographic projection exposure objective of the module or component is possible, errors that occur owing to mechanical inaccuracies, owing to slip-stick effects, owing to microroughnesses and corresponding tolerances in the actuators, being eliminated.

BRIEF DESCRIPTION OF THE DRAWINGS

Further advantageous configurations of the invention can be found in the rest of the dependent claims and the exemplary embodiment presented below with the aid of the drawing, in which:

DETAILED DESCRIPTION OF THE PREFERRED EMBODIMENTS

Figure 1:
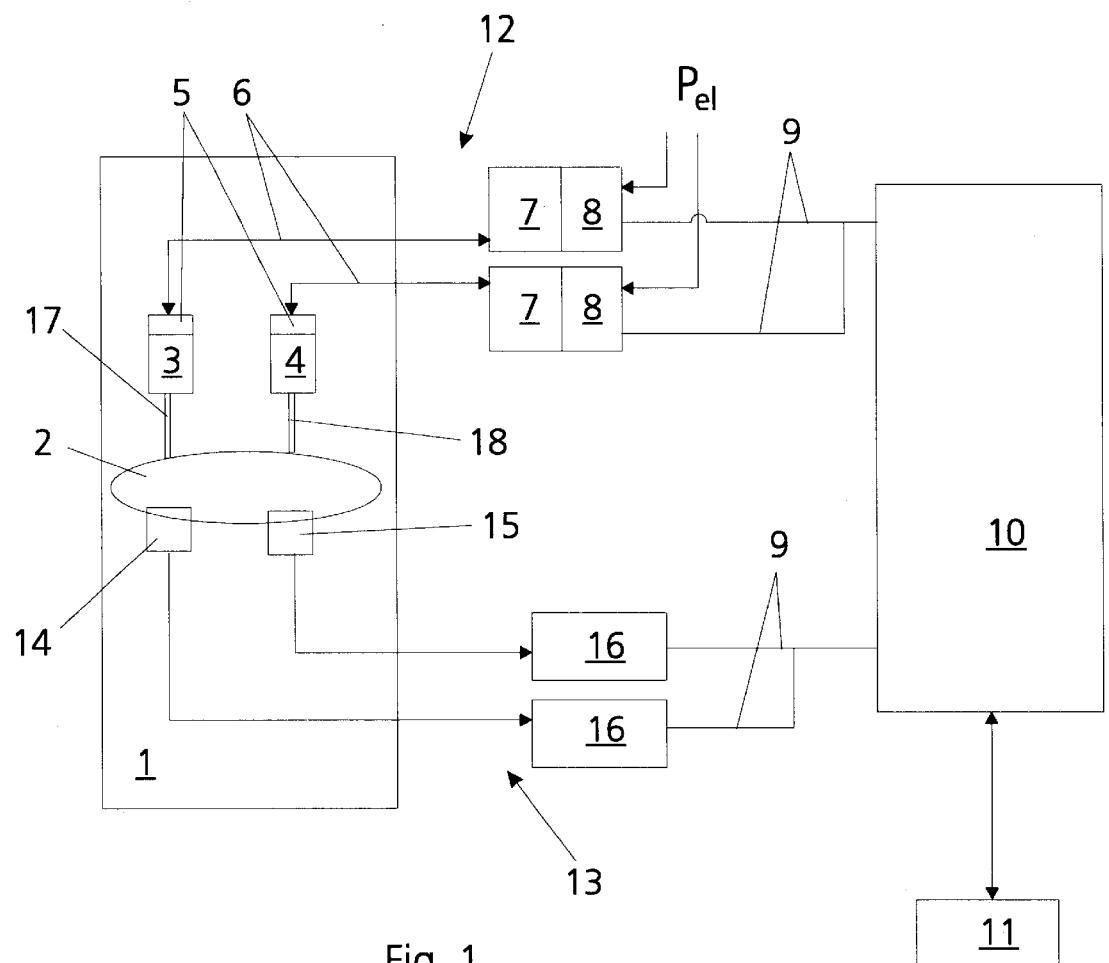
FIG. 1 shows a schematic plan of a setup for carrying out the method.

FIG. 1 shows an outline representation of an optical system with a microlithographic projection exposure objective 1 for manufacture of semiconductors with an indicated module 2 to be manipulated, here a lens 2. The manipulation of this lens 2 is in this case intended to be carried out by two actuators 3, 4 which, for example, may be of electrically driven design.

Each of the two actuators 3, 4 has a detector 5, designed as an incremental detector, which delivers information about the displacement that has taken place or at least the relative displacement of the actuators 3, 4, and which sends the information through corresponding control lines 6 to the respective amplifier elements 7 or the motor regulator 8. Through corresponding connection elements, the motor regulator also supplies the system with the power $P_{el}$ needed for operating the actuators 3, 4, and it is connected through further lines 9, for example a bus system 9, to a data processing unit 10. This data processing unit 10 can be connected to further external components 11, which are known per se, by which setpoint values can be specified, or the like.

Besides this manipulation chain 12 which has just been described, the setup has an acquisition chain 13, which is likewise connected to the data processing unit 10 through a bus system, possibly the same bus system 9. This acquisition chain 13 basically consists of two sensors 14, 15, which are designed to record the position of the lens 2 in two different space directions, as well as further functional electronic parts, for example amplifiers 16, demodulation units, or the like.

According to the method described in the introduction, the actuators 3, 4 are now capable of displacing the lens 2 in different space directions, to which end there may be mechanical transmission elements 17, 18 (indicated in outline) which, for example, are designed as lever arrangements or the like. After the position of the lens 2 has been correspondingly manipulated by the actuators 3, 4, the exact position of the lens 2 is recorded by the two sensors 14, 15 and is reported to the data processing unit 10. If the desired setpoint position is not yet identical to the actual position measured by the sensors 14, 15, the data processing unit 10 initiates a further displacement of the lens 2 by means of the actuators 3, 4, these method steps being repeated until the desired setpoint position has been achieved, at least within the scope of acceptable tolerances.

Figure 2:
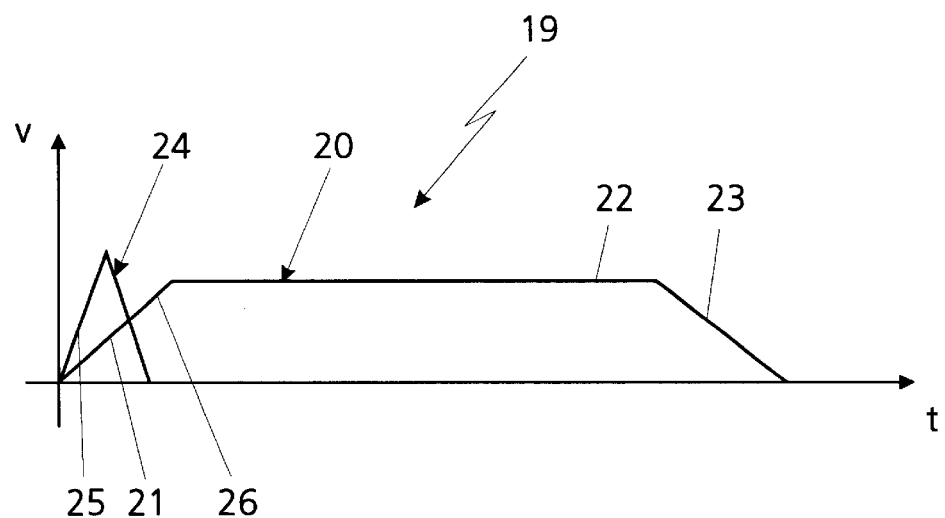
FIG. 2 shows examples of velocity profiles according to the method.

FIG. 2 now shows a diagram of velocity profiles 19, which is executed by the actuators 3 or 4 when the lens 2 is being manipulated. In the case represented here, with electrically driven actuators 3, 4, such velocity profiles 19 can be specified, for example, by a corresponding voltage profile that is applied to the actuators. In the case of other types of actuators, for example hydraulic actuators, a corresponding pressure profile would need to be produced and delivered to the actuator. In principle, this is immaterial for said method, so long as such a velocity profile 19 is executed by the actuators 3, 4.

With reference to the example of the curves represented in FIG. 2 on a velocity/time diagram, a few such velocity profiles 19 will now be illustrated for various cases selected by way of example.

A first velocity profile 20 is selected when there is a very large difference between the setpoint position and the actual position determined by the sensors 14, 15. The velocity profile 20 is in this case composed of a velocity gradient 21 rising from an initial velocity, here 0, an approximately constant velocity 22 for dealing with the majority of the path to be manipulated, as well as a velocity gradient 23 subsequently falling to a final velocity. In this special exemplary embodiment, both the initial velocity and the final velocity are 0. They could in principle, however, especially in the case of dynamic manipulation, also be final values or initial values reached by a previous manipulation, which could on the one hand be different than 0 and, on the other hand, could also be very different, i.e. for example, a very large initial velocity and a very small final velocity.

A second velocity profile 24 is composed of a very much more steeply rising gradient 25 and a gradient 26 falling immediately thereafter. Such a velocity profile 24 is suitable, for example, whenever the lens 2 is intended to travel a very small path section by means of the actuators 3, 4.

Figure 3:
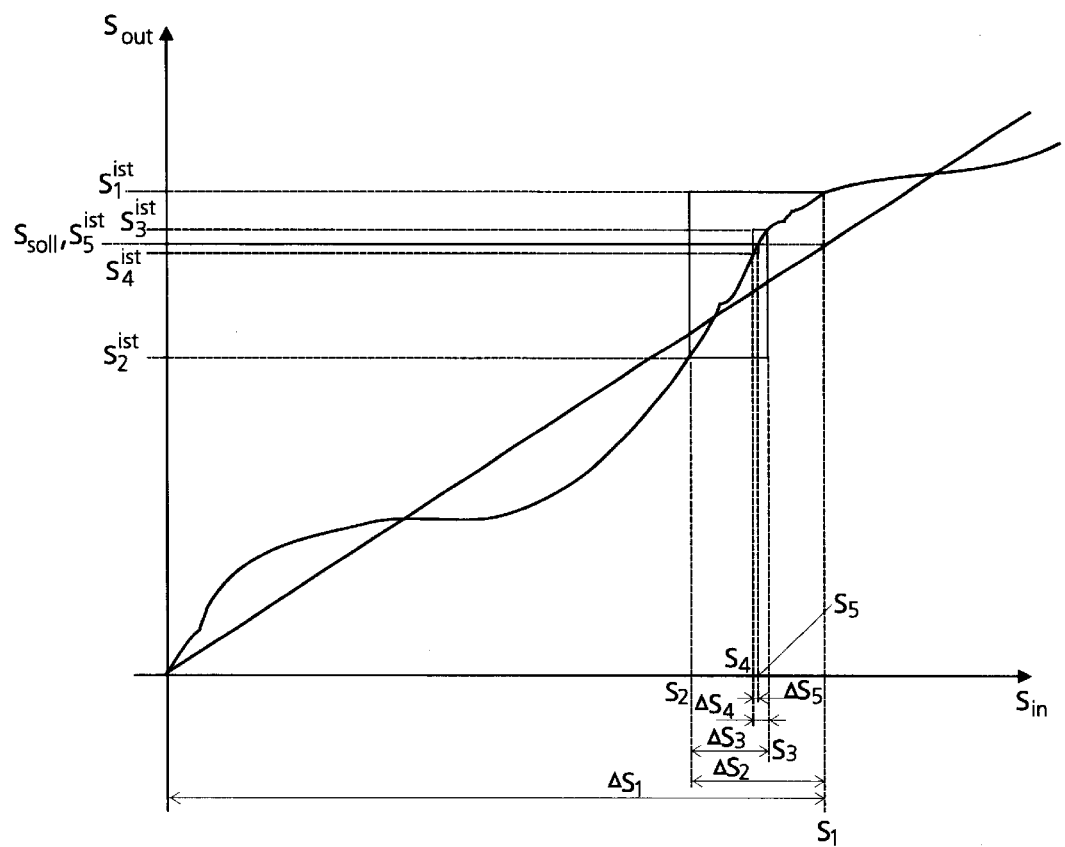
FIG. 3 shows a possible implementation of the method relating to a selected example with the aid of a diagram.

FIG. 3 will now explain a method for iterative approximation of the desired setpoint position in more detail, with reference to a selected example. In this case, it is essentially to be assumed that the relationship actually existing between the path input $s_{in}$ specified by the data processing unit 10 and the path output $s_{out}$ achieved in the system is by no means linear, at least in the range of the orders of magnitude to be manipulated here, which are a few nanometers in the case of movement paths, but rather follows the curve 27 that is represented here by way of example and is constant for this special case.

At least very roughly, however, this curve 27 can be approximated by the straight compensation line 28. For the setpoint position $s_{setpoint}$ to be reached, the position $S_1$ is therefore applied, following the straight compensation line 28, through a first manipulation by means of the path section $\Delta s_1$. Owing to the curve 27, however, this position $s_1$ does not lie at $s_{setpoint}$, as desired, but the actual position $s_1^{actual}$ is reached instead. Through the acquisition chain 13, the sensors 14, 15 determine that the position $s_1$ reached does not correspond to the setpoint position $s_{setpoint}$. Using a further velocity profile 19, the actuators 3, 4 then apply the correction path $\Delta s_2$, which is very much smaller than $\Delta s_1$ in the present case and is of negative design, as viewed from the point $s_1$.

After the position $s_2$ has been reached, the fact that the actual position of the lens 2 is now the position $s_2^{actual}$ is verified. This position $s_2^{actual}$ also differs from the desired setpoint position $s_{setpoint}$, and the data processing unit 10 induces a re-correction, by the path section $\Delta s_3$, to the position $s_3$, which in turn corresponds to the position $s_3$ actual according to the curve 27.

The steps described above are repeated, in the exemplary embodiment described here, until the setpoint position $s_{setpoint}$ is reached with the position $s_5^{actual}$.

As can be seen in the diagram, owing to the function between $s_{in}$ and $s_{out}$ that follows an at least roughly linear relationship, said path sections $\Delta s_1$ to $\Delta s_5$ respectively become smaller and change their sign in each case. Through this iterative approximation, it is therefore possible to reach the desired setpoint position $s_{setpoint}$ of the lens 2 very rapidly, both for adjustment purposes and for dynamic manipulation, by means of the setup represented in FIG. 1.

The method thereby permits a type of "self-learning" operation, since the iteration steps become smaller as the method progresses, which in turn further enhances the rapid implementation of the method.

Further, using storage facilities in the data processing unit 10, it is also possible to store the operation that has performed and, using the values obtained by means of this, to optimize the selection of the initial value for subsequent operation. In this way, it is also possible to obtain further improvements in terms of the manipulation or adjustment, especially with regard to the timing aspect and the position accuracy that is be achieved.

What is claimed is:

1. A method for dynamic manipulation of the position of a component in an optical system in the sub-μm range, the component moved by at least two drivers, which have detectors for determining at least a relative path displacement of said component, comprising the steps determining a position of component by at least two sensors, the sensors and the driver communicating with one another, and exerts at least one push on the component by the drivers, varying the duration of the push so that the displacement of the drivers is carried out with a time-variant velocity profile dictated as a function of a determined position ($s_n^{actual}$) with respect to a setpoint position ($s_{setpoint}$) of the component, redetermining the said position ($s_n^{actual}$) of the component after the velocity profile has been executed, and repeating the above steps until the desired position ($s_{setpoint}$) of the component is reached.

2. The method as claimed in claim 1, wherein the component has a velocity profile with at least one velocity gradient rising from an initial velocity and one velocity gradient falling to a final velocity, the slopes of which are varied in accordance with the path section still to be traveled.

3. The method as claimed in claim 2, wherein the initial velocity and the final velocity are both zero.

4. The method as claimed in claim 1, wherein the said drivers are respectively operated via electric motors, a corresponding voltage profile being applied to the motors in order to produce the velocity profile.

5. The method as claimed in claim 4, wherein the displacement of the motors is limited by at least one detector as an incremental detector at each of the motors.

6. The method as claimed in claim 1, wherein the said sensors are connected to an electronic data processing unit, and wherein the said drivers with their detectors are connected to an electronic data processing unit, by which the procedure is controlled.

7. The method as claimed in claim 1, wherein the said sensors are connected as an acquisition chain via evaluation instruments, amplifiers, or the like, to an electronic data processing unit, and wherein the said drivers with their detectors are connected to an electronic data processing unit, by which the procedure is regulated.

8. The method as claimed in claim 6, wherein the said data processing unit has storage facilities, in which the velocity profiles are stored as a function of the setpoint/actual positions, this memory data being employed to influence the subsequent velocity profiles.

9. The method as claimed in claim 7, wherein the said data processing unit has storage facilities, in which the velocity profiles are stored as a function of the setpoint/actual positions, this memory data being employed to influence the subsequent velocity profiles.

10. A method for adjustment of a component in an optical system in the sub-μm range, the component being displaced by at least two drivers, which have detectors for determining at least their relative path displacements, comprising the steps of determining a position of the component by at least two sensors, the sensors and the drivers communicating with one another with their detectors, and exerting at least one push on the component by the drivers, varying the duration of the push and carrying out the displacement of the drivers with a time-variant velocity profile dictated as a function of a determined position ($s_n^{actual}$) with respect to a setpoint position ($s_{setpoint}$) of the component, redetermining the position ($s_n^{actual}$) of the component after the velocity profile has been executed, and repeating the aforementioned steps until the desired position ($s_{setpoint}$) of the component is reached.

11. The method as claimed in claim 10, wherein the component has a velocity profile with at least one velocity gradient rising from an initial velocity and one velocity gradient falling to a final velocity, the slopes of which are varied in accordance with the path section still to be traveled.

12. The method as claimed in claim 11, wherein the initial velocity and the final velocity are both zero.

13. The method as claimed in claim 10, wherein the said drivers are respectively operated via electric motors, a corresponding voltage profile being applied to the said motors in order to produce the velocity profile.

14. The method as claimed in claim 13, wherein the displacement of the motors is limited by at least one detector as an incremental detector at each of the motors.

15. The method as claimed in claim 10, wherein the sensors are connected to an electronic data processing unit, and wherein the drivers with their detectors are connected to an electronic data processing unit, by which the procedure is controlled.

16. The method as claimed in claim 10, wherein the said sensors are connected to an electronic data processing unit, and wherein the drivers with their detectors are connected to an electronic data processing unit, by which the procedure is regulated.

17. The method as claimed in claim 15, wherein the data processing unit has storage facilities, in which the executed velocity profiles are stored as memory data as a function of the setpoint/actual positions, said memory data being employed to influence subsequent velocity profiles.

18. The method as claimed in claim 16, wherein the data processing unit has storage facilities, in which the already executed velocity profiles are stored as memory data as a function of the setpoint/actual positions, said memory data being employed to influence subsequent velocity profiles.

19. A method for dynamic manipulation of a component in a microlithographic projection exposure objective in the sub-$\mu$m range, the component being displaced by at least two drivers, which have detectors for determining at least their relative path displacements, comprising the steps of determining a position of the component by at least two sensors, the sensors and the drivers communicating with one another and exerting at least one push being exerted on the component by the drivers, varying the duration of the impulse so as to carry out the displacement of the drivers with a time-variant velocity profile dictated as a function of a determined position ($s_n^{actual}$) with respect to a setpoint position ($S_{setpoint}$) of the component, redetermining the position ($s_n^{actual}$) of the component after the velocity profile has been executed, and said steps being repeated until the desired position ($S_{setpoint}$) of the component is reached.

20. The method as claimed in claim 19, wherein the velocity profile has at least one velocity gradient rising from an initial velocity and one velocity gradient falling to a final velocity, the slopes of which are varied in accordance with the path section still to be traveled.

21. The method as claimed in claim 20, wherein the initial velocity and the final velocity are both zero.

22. The method as claimed in claim 19, wherein the said drivers are respectively operated via electric motors, a corresponding voltage profile being applied to the motors in order to produce the velocity profile.

23. The method as claimed in claim 22, wherein the displacement of the said-motors is limited by at least one detector as an incremental detector at each of the motors.

24. The method as claimed in claim 19, wherein the said sensors are connected to an electronic data processing unit, and wherein the drivers with their detectors are connected to an electronic data processing unit, by which the procedure is controlled.

25. The method as claimed in claim 19, wherein the said sensors are connected to an electronic data processing unit, and wherein the drivers with their detectors are connected to an electronic data processing unit, by which the procedure is regulated.

26. The method as claimed in claim 24, wherein the said data processing unit has storage facilities, in which the already executed velocity profiles are stored as memory data as a function of the setpoint/actual positions, said memory data being employed to influence subsequent velocity profiles.

27. The method as claimed in claim 25, wherein the said data processing unit has storage facilities, in which the already executed velocity profiles are stored as memory data as a function of the setpoint/actual positions, this memory data being employed to influence subsequent velocity profiles.

28. A method for adjustment of the position of a component in a microlithographic projection exposure objective in the sub-$\mu$m range, the component being displaced by at least two drivers, which have detectors for determining at least their relative path displacements, comprising the steps of determining a position of the component by at least two sensors, the sensors and the drivers with their detectors communicating with one another and exerting at least one push on the component by the drivers, varying the duration of the push carrying out the displacement of the drivers with a time-variant velocity profile dictated as a function of a determined position ($s_n^{actual}$) with respect to a setpoint position ($S_{setpoint}$) of the component, the position ($s_n^{actual}$) of the component being re-determined after the velocity profile has been executed, and said steps being repeated until the desired position ($S_{setpoint}$) of the component is reached.

29. The method as claimed in claim 28, wherein the velocity profile has at least one velocity gradient rising from an initial velocity and one velocity gradient falling to a final velocity, the slopes of which are varied in accordance with the path section still to be traveled.

30. The method as claimed in claim 29, wherein the initial velocity and the final velocity are both zero.

31. The method as claimed in claim 28, wherein the said drivers are respectively operated via electric motors, a corresponding voltage profile being applied to the motors in order to produce the velocity profile.

32. The method as claimed in claim 31, wherein the displacement of the motors is limited by at least one detector as an incremental detector at each of the motors.

33. The method as claimed in claim 28, wherein the said sensors are connected to an electronic data processing unit, and wherein the drivers with their detectors are connected to an electronic data processing unit, by which the procedure is controlled.

34. The method as claimed in claim 28, wherein the said sensors are connected to an electronic data processing unit, and wherein the drivers with their detectors are connected to an electronic data processing unit, by which the procedure is regulated.

35. The method as claimed in claim 33, wherein the said data processing unit has storage facilities, in which the already executed velocity profiles are stored as memory data as a function of the setpoint/actual positions, said memory data being employed to influence subsequent velocity profiles.

36. The method as claimed in claim 34, wherein the said data processing unit has storage facilities, in which the already executed velocity profiles are stored as memory data as a function of the setpoint/actual positions, said memory data being employed to influence subsequent velocity profiles.

* * * * *

UNITED STATES PATENT AND TRADEMARK OFFICE
CERTIFICATE OF CORRECTION

PATENT NO. : 6,759,670 B2
DATED : July 6, 2004
INVENTOR(S) : Karl-Eugen Aubele

It is certified that error appears in the above-identified patent and that said Letters Patent is hereby corrected as shown below:

Column 5,
Line 14, delete "$S_1$" and replace with -- $s_1$ --.

Column 6,
Line 51, delete "push and carrying" and replace with -- push, and carrying --.

Column 7,
Line 38, delete "$(S_{setpoint})$" and replace with -- $(s_{setpoint})$ --.
Line 54, delete "the said-motors" and replace with -- the motors --.

Column 8,
Lines 24 and 27, delete "$(S_{setpoint})$" and replace with -- $(s_{setpoint})$ --.

Signed and Sealed this

Eleventh Day of January, 2005

JON W. DUDAS
*Director of the United States Patent and Trademark Office*